(12) United States Patent
Hartmann et al.

(10) Patent No.: US 10,948,314 B2
(45) Date of Patent: Mar. 16, 2021

(54) POSITION DETECTOR

(71) Applicant: STRATEC SE, Birkenfeld (DE)

(72) Inventors: Reinhard Hartmann, Bretten (DE);
Rüdiger Retzlaff, Neuenbürg (DE);
Oliver Bürk, Unterreichenbach (DE);
Uwe Maschke, Keltern (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 16/360,963

(22) Filed: Mar. 21, 2019

(65) Prior Publication Data

US 2019/0390979 A1 Dec. 26, 2019

(30) Foreign Application Priority Data

Jun. 25, 2018 (GB) .................................... 1810365

(51) Int. Cl.
*G01D 5/14* (2006.01)
*H02P 6/16* (2016.01)

(52) U.S. Cl.
CPC ............... *G01D 5/142* (2013.01); *H02P 6/16* (2013.01)

(58) Field of Classification Search
CPC ........ G01D 3/036; G01D 5/142; G01D 5/145; H02P 21/18; H02P 6/16; H02P 6/17
See application file for complete search history.

(56) References Cited

U.S. PATENT DOCUMENTS

| | | | |
|---|---|---|---|
| 2014/0085116 A1* | 3/2014 | White .................... | G01R 25/00 341/111 |
| 2015/0253159 A1* | 9/2015 | Kamatani ................. | H02P 6/16 318/400.06 |
| 2017/0343382 A1* | 11/2017 | Fukumura .............. | G16H 50/20 |
| 2017/0353130 A1* | 12/2017 | Park ..................... | H04B 5/0081 |

FOREIGN PATENT DOCUMENTS

| | | |
|---|---|---|
| DE | 198 15 964 A1 | 10/1999 |
| EP | 3 393 037 A1 | 10/2018 |

* cited by examiner

*Primary Examiner* — Son T Le
*Assistant Examiner* — Adam S Clarke
(74) *Attorney, Agent, or Firm* — 24IP Law Group USA, PLLC; Timothy R DeWitt

(57) ABSTRACT

A method for determining the position of a rotor in an electronically commuted motor. The method comprises the steps of calculating the rotation angle using three Hall-sensors; identifying and correcting phase errors; and determining and correcting cyclic errors.

8 Claims, 1 Drawing Sheet

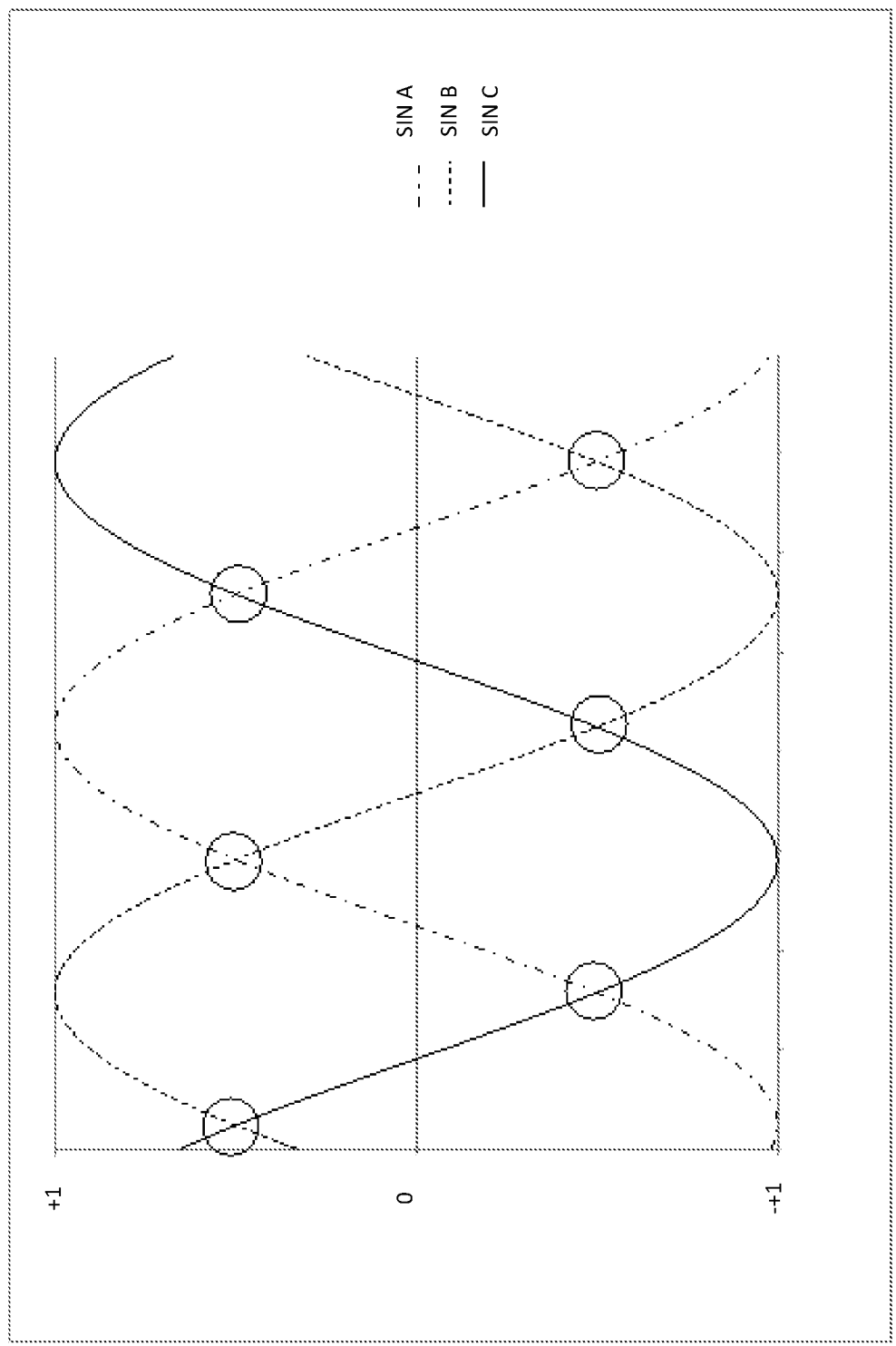

POSITION DETECTOR

CROSS-REFERENCE TO RELATED APPLICATIONS

The present application claims priority to British Patent Application No. GB 1810365.5 filed on Jun. 25, 2018. The aforementioned application is hereby incorporated by reference in its entirety.

BACKGROUND OF THE INVENTION

Field of the Invention

The field of the present invention relates to a method for determining the position of a rotor in an electronically commuted motor.

Brief Description of the Related Art

Brushless DC (BLDC) motors also known as electronically commutated (EC) motors. Such motors are synchronous motors that are driven by DC electricity through an inverter or switching power supply which produces AC electric current to drive each phase of the motor via a closed loop controller. The controller provides pulses of current to the motor windings that control the speed and torque of the motor.

Brushless motors are more efficient than brushed motors in converting electricity into mechanical power, e.g. rotation. This improvement depends on the frequency at which the electricity is switched, determined by a position sensor feedback used for detecting the angle of the rotor.

In known methods, positioning errors are either not detected or they are determined by means of a precise reference encoder and will be included in a calculation table for obtaining an error-free position signal. However, this requires that the motor has to be calibrated with a precise reference position encoder during its manufacture.

This method results in a greater effort in the manufacture and maintenance of brushless motors. It is a disadvantage that a motor cannot easily be replaced by another motor, simply because engine control and motor are a functional unit with stored individually applicable control parameters for each motor. A pre-calibrated motor and control unit has always to be replaced together or a calibration has to be carried out. The accuracy of the position detection will not be sufficient without calibration or said control device.

Published German patent application No. DE 198 15 964 A1 discloses such an electric motor that has a coil with iron-less winding and an integrated electronic control device. The electric motor is supplied with sinusoid currents or voltages by a sinus commutator. The control device has a rotational speed control for setting a magnitude of the sinus-shaped currents or voltages. The electronic control device has further a position control for the motor shaft using three position sensors that are arranged. DE 198 15 964 A1 teaches that the angle of the rotor can be determined reliably by evaluation of signals from two of three Hall-sensors which are shifted by 120° each around the rotor. A reduction of errors is achieved by using a weighting function that is not explained in detail.

Published European patent Application EP 3 393 037 A1 relates to a motor module and motor authentication method. A module motor according to this document comprises a motor with a mover, a motor controller and a storage device in which motor fingerprint information that is unique to the motor and depends on manufacturing modifications of the motor is recorded. A disadvantage related to the teaching of this document is that the so-called fingerprint

SUMMARY OF THE INVENTION

It is an object of the present invention to provide a method for determining the angle of a brushless motor's rotator.

This objective is solved by the features and elements as described in the independent claims, while meaningful embodiments are described by the features and elements of the dependent claims.

The instant invention provides A method for determining the position of a rotor in an electronically commuted motor, comprising the steps of
 a. Calculating the rotation angle using three Hall-sensors by using a Clarke transformation for converting the three sinus signals from the Hall-sensors into a rotation angle;
 b. Identifying and correcting phase errors;
 c. Determining and correcting cyclic errors.

The method may use sinus signals from three Hall-sensors that are shifted by 120°.

In a further aspect of the present invention, the signals from the Hall-sensors will be constantly checked for minimums and maximums for normalizing them.

It is further envisaged that peak outliners can be removed, and an average value is formed from the remaining maximal values.

In a further aspect it is intended that a factor calculated from a phase-offset per phase can be used for correcting sinusoidal position errors per phase.

The method may further provide that the position of the rotor is determined and stored cyclically at equidistant time intervals.

In a further embodiment of the present invention, a calibration can be carried out in error-free condition, in a new condition or after a maintenance.

It may further be intended that a deviation of the actually measured positions from an ideal straight line is directly measured and assigned to a rotation angle.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part n the description which follows and in part will be obvious from the description, or may be learned by practice of the invention

BRIEF DESCRIPTION OF THE FIGURES

For a more complete understanding of the present invention and the advantages thereof, reference is now made to the following description and the accompanying drawings, in which:

FIG. 1 shows a plot of signals from three Hall-sensors over the angle of rotation.

DETAILED DESCRIPTION OF THE INVENTION

The present invention is based on using three Hall-sensors shifted by 120° for obtaining a high resolution with an AD (analog digital) converter. Compared to using only two sensors 1.5 times more output data will be available. In addition, the above-mentioned position errors of the sensors and shape errors in the sinus signal will be reduced, because they usually have different effects on different signal pairs.

A positioning error of the sensors is by orders of magnitude higher than the shape error of the sinus wave signal. Shape errors of the sinus signal are e.g. produced by uneven magnetization or shape of the permanent magnets and are systemic rather small. Assuming an ideal course of the sinusoidal shape, the phase error can be calculated at certain rotational positions and the factor calculated therefrom used to correct the resulting position signal. As a result, a more precise position can already be determined without any additional calibration.

Using such a phase error calculation allows to evaluate the mounting position error of the Hall-sensors, which means that the manufacturing process can be checked and monitored.

Adding a new method for calibration, which does not require additional measurement systems or devices, the accuracy of rotator position determination can further be increased.

The present invention is thus based on several parts:
1. Calculation of the rotation angle using three Hall-sensor signals
2. Identification and correction of phase errors
3. Determination and correction of cyclic errors 1. Calculation of the Rotation Angle Using Three Hall-Sensor Signals The three sinus signals, which are phase-shifted by 120°, are constantly checked for their minimums and maximums and thus the sensor signal of the three Hall-sensors is normalized to a standard size, which takes place permanently during running operation of the motor.

At the beginning, after switching the system on, minimum and maximum values are given as start values, having a sufficient safety distance to the typical minimum and maximum values of the application-specific sinus signals. This is necessary to provide valid values for the system right from the beginning on. Thus, the system is directly functional, but reaches full accuracy only after all minima and maxima have been traversed once.

When determining the minima and maxima, signal peaks/outliers are removed, and an average value is formed from the remaining maximum values. In case of a multipolar system, separate minimum and maximum values have taken into account for each pool pair.

Using the Clarke transformation known in mathematics, the three sinus wave signals that are phase-shifted by 120° are converted into a resulting rotation angle. The calculated rotation angle can be used instead of an encoder for position control. In addition, due to the fixed reference to the rotor position, an accurate sinus commutation for the three phases of the EC motor can be derived.

The Formulas of the Clarke Transformation:

$$\alpha = \left(\text{Phase}_A - \frac{1}{2} \cdot \text{Phase}_B - \frac{1}{2} \cdot \text{Phase}_C\right) \cdot \frac{2}{3}$$

$$\beta = \left(\left(\frac{\sqrt{3}}{2} \cdot \text{Phase}_B\right) - \left(\frac{\sqrt{3}}{2} \cdot \text{Phase}_C\right)\right) \cdot \frac{2}{3}$$

$$\text{Winkel}\phi = \left(a\tan2(\beta, \alpha) \cdot \frac{180°}{\pi} + 180°\right)$$

2. Identification and Correction of Phase Errors

Plotting the signals of the three Hall-sensors over the angle of rotation in a diagram (comp. FIG. 1: X-axis=rotation angle (360°), Y-axis: standardized amplitude) it becomes obvious that six crossing points of the three sinusoidal signals (SIN A; SIN B; SIN C) result. These intersections are all at the same total Y value, not taking the signs into account. Shifting the position=phase of one of the three sinusoidal signals, results in a shift of the position of the respective crossing points. This means, that based on the height of these crossing points in terms of its position in the diagram, the position or phase error can be determined and corrected. A specific phase offset results in a specific position error, in the form of a sinus. By knowing the phase-offset as a factor per phase, the resulting sinusoidal position error per phase can be corrected accordingly.

The position of two signals to each other is already sufficiently determined via a crossing point. Using two crossing points for phase offset calculation reduces the error caused for instance by the shape error of the sinus signal, because this error usually does not have the same effect on both crossing points.

In essence, a total of six intersections result from three sinuses. The farer a crossing point deviates from its standard position, the greater is the phase error or the mounting position error, whereby blurring due to the sinusoidal shape error must be taken into account.

3. Determination and Correction of Cyclic Errors

The described method allows for an error which cyclically repeats, in particular the angle of rotation of an EC motor, if no additional internal or external reference signal will be determined for correcting the error.

A prerequisite for this method is an arrangement where the errors repeat at predetermined intervals, i.e. cyclically, and the relative error returns to 0 after a complete cycle (e.g. after a complete revolution), as it the case in an EC motor with analogue Hall-sensors. The method serves to minimize "non-linearities" within one cycle/revolution. The method makes use of the moment of inertia of the used system, because the rotational speed within a revolution will only change negligibly little. It is to be noted that the present invention is based on considering a whole motor revolution for the calculation of the actual speed in order to eliminate linearity errors.

For this purpose, the motor can be brought to a speed advantageous for the method and the specific arrangement and, at the same time, the position is determined and stored cyclically at equidistant time intervals. The drive may not be operated position or speed controlled, because in that case the position or speed would follow only the faulty position signal but may be controlled only with a fixed torque input, i.e. predefined control voltage. This means, on one hand, that the resulting speed is not exactly predictable (not regulated), but that a maximum uniform speed, regardless of the faulty measured rotor position, is achieved. In contrast to methods known in prior art documents (EP 3 393 037 A1), the use of a constant (unregulated) motor voltage (PWM) produces an astonishingly precise concentricity/concentricity enabling the calibration method according to the present invention.

A further prerequisite is also a possible interference-free system, since disturbances in the synchronization would directly result in a poor calibration. The calibration shall be carried out in error-free condition, preferably in a new condition and should only be repeated after a successful maintenance. According to the inertia of the system, there is a theoretically direct linear relationship between the time and the measured position, i.e. the position values determined relative to a defined starting point must increase linearly with each time of measurement.

The prerequisite for this, of course, are fixed time intervals between the times of measuring. The deviation of the actually measured positions from an ideal straight line is a direct measurement of the non-linearity, which can directly be assigned to a rotation angle. Before a measurement can be made with sufficient accuracy, the engine must first be brought to a constant speed. The measurement is preferably carried out over several cycles or revolutions using a continuous averaging.

An advantage of the described method is the use of the Clarke transformation, which can include all three phases for the calculation. A whatsoever weighting function is not necessary because all three phases are always included in the calculation. By using all three phases, a higher position resolution can be achieved with the same ADC resolution. Shape and phase errors of the sine signals are better compensated using all three phases, resulting in a more accurate position signal.

The method according to the present invention is based on using a Clark transformation instead of a kind of geometric extraction of the sensor sections (from intersection point to intersection point) as published European patent application EP 3 393 037 A1 teaches for instance. The advantage of using a Clarke transformation is that no "linearization", as mentioned in published European patent application EP 3 393 037 A1, is necessary.

The determination and correction of the phase errors additionally ensures a more precise position calculation even without a special calibration. In addition, by determining the phase error, the production quality can be monitored and evaluated without additional measuring means.

The calibration method according to the present invention, has in contrast to other methods the advantage, that it does not need additional measuring devices and is therefore also applicable in the installed state, which means that there is no additional working step necessary in the production or repair.

It is irrelevant whether the required arithmetic operations, e.g. the Arcus-tangent function necessary according to the Clarke Transformation, is calculated using a table or via mathematical algorithms. Also, conversion or summary of formulas or simplifications for a quicker calculation are obligatory.

For the calibration routine, the determination of the ideal straight can be done by measuring the exact speed (the measurement is extremely precise when the calculation is always performed from the same rotor position to the same rotor position) or via the Calculation of the slope to the end point of a rotation is done, which is ultimately nothing other than the speed.

Published European patent application EP 3 393 037 A1 uses the position of the intersections of the three sine signals (three sensors) only to determine the position at which a sectional part goes over into the next one. However, the document is silent about the position of the crossing points also representing a measure of the "installation error". The present invention uses exactly this possibility to correct the phase error for achieving an additional improvement for correcting phase errors.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for determining the position of a rotor in an electronically commuted motor, comprising the steps of
    bringing the rotor of a new or successful maintained motor to a speed using a constant motor voltage for obtaining a precise concentricity;
    measuring deviations of actually measured positions from an ideal straight line using three Hall-sensors for obtaining sinus signals
    calculating the rotation angle by using a Clarke transformation for converting the three sinus signals, which are constantly checked for their minimums and maximums, from the Hall-sensors into a rotation angle;
    identifying and correcting phase errors;
    determining and correcting cyclic errors.

2. The method of claim 1, using sinus signals from three Hall-sensors that are shifted by 120°.

3. The method of claim 1, wherein the signals from the Hall-sensors are constantly checked for normalizing them.

4. The method of claim 1, wherein signal peak outliners are removed, and an average value is formed from the remaining maximal values.

5. The method of claim 1, wherein a factor calculated from a phase-offset per phase is used for correcting sinusoidal position errors per phase.

6. The method of claim 1, wherein the position of the rotor is determined and stored cyclically at equidistant time intervals.

7. The method of claim 1, wherein a calibration is carried out in error-free condition, in a new condition or after a maintenance.

8. The method of claim 1, wherein the measured deviation of the actually measured positions from an ideal straight line is directly measured and assigned to a rotation angle.

* * * * *